(12) United States Patent
Wormald

(10) Patent No.: US 9,237,548 B2
(45) Date of Patent: *Jan. 12, 2016

(54) PREDICTING USER AVAILABILITY FROM AGGREGATED SIGNAL STRENGTH DATA

(71) Applicant: RESEARCH IN MOTION LIMITED, Waterloo (CA)

(72) Inventor: Chris Wormald, Kitchener, CA (US)

(73) Assignee: BlackBerry Limited, Waterloo (CA)

( * ) Notice: Subject to any disclaimer, the term of this patent is extended or adjusted under 35 U.S.C. 154(b) by 248 days.

This patent is subject to a terminal disclaimer.

(21) Appl. No.: 13/789,622

(22) Filed: Mar. 7, 2013

(65) Prior Publication Data

US 2013/0189995 A1 Jul. 25, 2013

Related U.S. Application Data

(63) Continuation of application No. 11/740,381, filed on Apr. 26, 2007, now Pat. No. 8,396,470.

(51) Int. Cl.
*H04W 4/00* (2009.01)
*H04W 68/00* (2009.01)
*H04L 29/08* (2006.01)

(52) U.S. Cl.
CPC .............. *H04W 68/00* (2013.01); *H04L 67/24* (2013.01)

(58) Field of Classification Search
USPC .......... 455/432.1, 412.2, 456.1, 456.3, 456.5, 455/456.6, 414.1, 414.2
See application file for complete search history.

(56) References Cited

U.S. PATENT DOCUMENTS

| | | | |
|---|---|---|---|
| 6,721,572 B1 * | 4/2004 | Smith et al. | 455/456.1 |
| 7,426,380 B2 * | 9/2008 | Hines et al. | 455/404.2 |
| 7,826,830 B1 * | 11/2010 | Patel et al. | 455/414.1 |
| 8,396,470 B2 * | 3/2013 | Wormald | 455/432.1 |
| 2002/0029108 A1 * | 3/2002 | Liu et al. | 701/208 |

* cited by examiner

*Primary Examiner* — Justin Lee
(74) *Attorney, Agent, or Firm* — Jenna L. Wilson; Dimock Stratton LLP

(57) ABSTRACT

A system and method is provided for determining the availability of a mobile communications device on a network based on a prediction that the device will cross a pre-defined service boundary between two different coverage areas serviced by two different service providers. Specifically, when the device is predicted to cross the service boundary, or has crossed the boundary, a notification of a change in service is issued to at least one of the user of the device, a presence service, or another network operator. The notification may include a change in the presence status of the mobile communications device.

21 Claims, 4 Drawing Sheets

PREDICTING USER AVAILABILITY FROM AGGREGATED SIGNAL STRENGTH DATA

CROSS REFERENCE TO RELATED APPLICATIONS

This application is a Continuation of U.S. application Ser. No. 11/740,381, filed on Apr. 26, 2007, entitled "PREDICTING USER AVAILABILITY FROM AGGREGATED SIGNAL STRENGTH DATA," the entirety of which is incorporated herein by reference.

TECHNICAL BACKGROUND

1. Technical Field

This invention relates to telecommunications. In particular, this invention relates to the updating of user presence information on a wireless messaging network.

2. Description of the Related Art

Many mobile communications devices are multi-functional and include wireless systems for both voice communications (radiotelephony) and packet data communications. The availability of voice and packet data services to the user of a mobile communication device depends, in part, on the received signal strength at the mobile device. In some situations, a mobile device user may not be available to participate in data or telephony communications, for example when the user's device is beyond the reach of a mobile communications network. In other situations, the received signal strength at the mobile device may be too weak to allow for voice or data communications to be initiated or continued.

While some mobile communication network provide "presence" services that may indicate to other users on the network whether a particular mobile user is available for voice or packet data communications according to the mobile user's reported status (for example, whether the user's mobile device is powered on or off, or whether the user has chosen to make him or herself unavailable for packet data communication), such presence services do not provide a complete solution to the problem of a mobile user who moves outside the network's coverage, or moves into a region where the signal strength is too weak to maintain a connection between the mobile device and the network. The mobile device user is typically not provided with advanced warning regarding impending signal loss; the user's first notification that the received signal strength has dropped below an acceptable threshold is typically the sudden termination of an ongoing voice call. Alternatively, there is generally no opportunity to provide advance notice to another party engaged in communication with the mobile device user that the user's mobile device is about to move outside of mobile communications network coverage or that the received signal strength at the mobile device is likely to drop below an acceptable level. This may prove frustrating to the mobile user and other parties communicating with the user, who may wish to be able to complete certain tasks requiring voice or data connectivity before the connection between the mobile device and the network is dropped.

It would accordingly be advantageous to provide a system and method a mobile device user or other network user may be notified of a pending loss of signal at the mobile device, or a change in presence or availability status on the network as a result of a pending loss of signal at the mobile device.

BRIEF DESCRIPTION OF THE DRAWINGS

In drawings which illustrate by way of example only a preferred embodiment of the invention.

DETAILED DESCRIPTION

Figure 1:
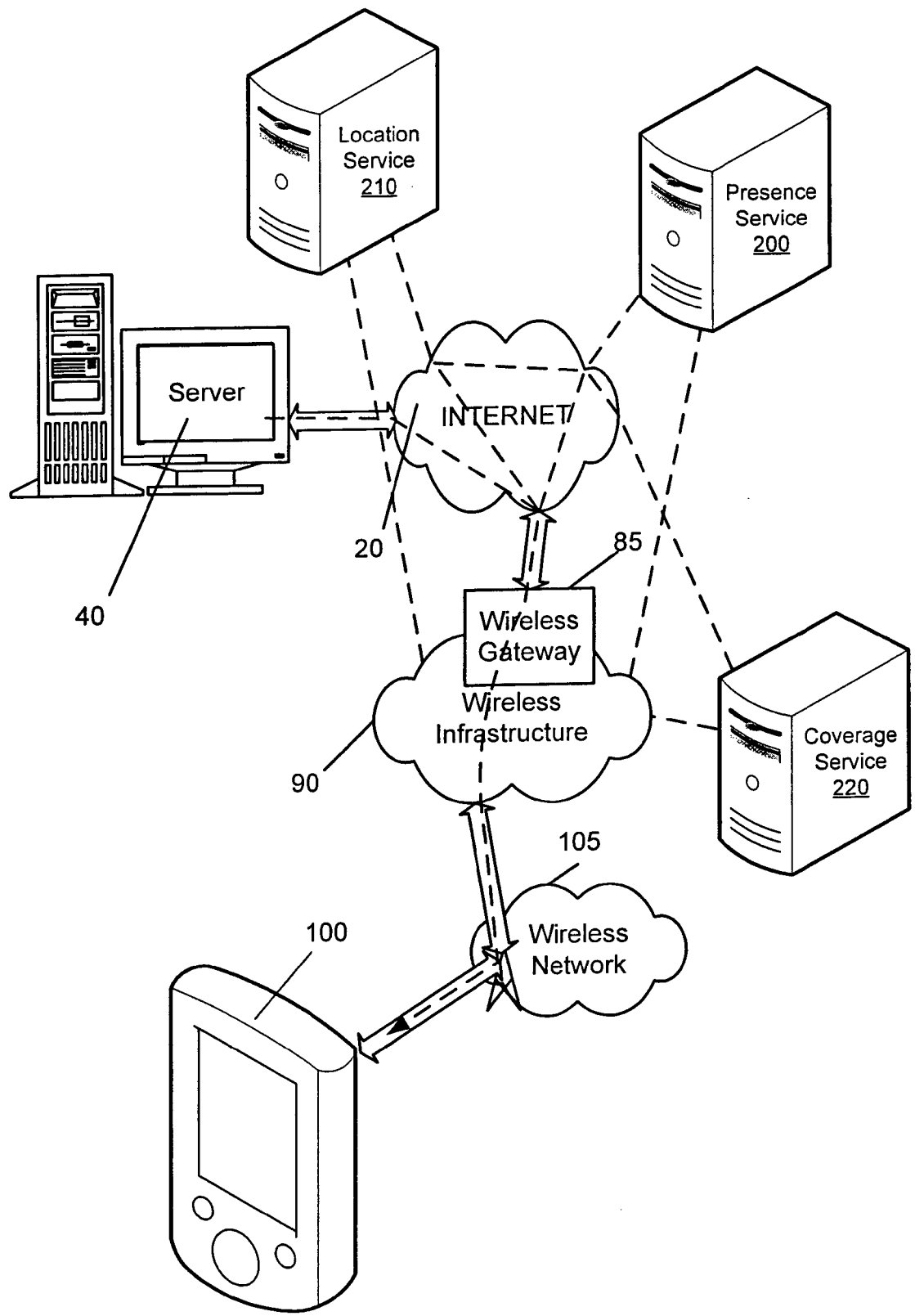
FIG. 1 is a schematic diagram of an exemplary network topology, including a mobile device and a presence server.

The system and method of the invention will be described in detail below by way of example only in the context of a hand-held mobile communications device 100 as illustrated in FIG. 1. It will be appreciated by those skilled in the art that the devices referred to herein as mobile communications devices may include other devices capable of wireless data communication, including, but not limited to, personal computers, mobile communication devices, or mobile computing devices, provided with functionality for wireless data and optionally voice communication over a network, but may also be provided with personal or productivity applications, or devices whose main function is directed to computing or executing productivity applications, but are also adapted to enable wireless data communication. Such devices include, but are not limited to, laptop and notebook computers, PDAs, smartphones, and the like. In the preferred embodiment, the mobile communications device 100 is provided with a location module, comprising software or hardware configured to receive data usable in determining the physical location of the device 100, and optionally to compute the physical location of the device, for example a Global Positioning System (GPS) module.

The mobile communications device 100 may, for example, be connected to an ISP (Internet Service Provider) on which the user of the device 100 has an account, located within a company, possibly connected to a local area network (LAN), and connected to the Internet 20, or connected to the Internet 20 through an ASP (application service provider). Those skilled in the art will appreciate that the system shown in FIG. 1 may instead be connected to a wide area network (WAN) other than the Internet 20.

The wireless gateway 85 and infrastructure 90 provide a link between the Internet 20 and wireless network 105. The wireless infrastructure 90 determines the most likely network for locating a given user and tracks the user as they roam between countries or networks. Messages and other data may be delivered to the mobile communications device 100 via wireless transmission, typically at a radio frequency (RF), from a base station in the wireless network 105 to the mobile communications device 100. The particular network 105 may be any wireless network over which messages may be exchanged with a mobile communication device.

Typically, the mobile communications device 100 is registered on a wireless service provider's (or "carrier's") network. The carrier's network may provide the mobile communications device 100 with access to a public switched telephone network and/or with a cellular network for telephony services, as well as to a network supporting packet-switched communications for text messaging services such as instant messaging (IM), electronic mail (e-mail), and multimedia messaging service (MMS), for example GPRS or IMS (Internet Protocol Multimedia Subsystem). The wireless network 105, infrastructure 90 and gateway 85 may operate as the access network for the packet-switched communications network, which may be operated by the carrier or by another party. It will be appreciated that these text communication and network examples are not intended to limit the scope of the systems and methods provided herein. In the description below, reference to "data communication" or "packet data communication" includes text communication functions and other packet-switched communication functions such as those described above, as opposed to telephony functions.

A server system 40, such as an enterprise messaging server system, is provided in the network of FIG. 1. The server system 40 may be implemented on one or more networked computers within the firewall of a corporation, or on a computer within an ISP or ASP system or the like. The server system 40 may act as the application, network access, and/or file server for one or more communication devices. In a preferred embodiment, the server system 40 may provide messaging functions. The mobile communications device 100, if it is configured for receiving and possibly sending e-mail or other forms of data communication, may be associated with an account on the server system 40. If the server system 40 acts as a message server, the server system 40 may support either a so-called "pull" or "push" message access scheme, wherein the mobile communications device 100 must request that stored messages be forwarded by the message server to the mobile communications device 100 ("pull"), or the server system 40 may be provided with means for automatically redirecting messages addressed to the user of the mobile communications device 100 as they are received ("push"). Other software products and other components that are often used in conjunction with the functions of the server system 40 described herein will be known to those skilled in the art.

Included in the network generally illustrated in FIG. 1 is a presence service 200 for the user of the mobile communications device 100. The presence service, which may also be referred to as a presence server, stores information relating to the user's availability status, or "presence", on the network. This presence information comprises, at a minimum, data relating to the user's availability on the network, which may be simply data indicating that the user is "available" or "not available"/"offline"; the presence information may also include more robust data such as information regarding the user's activities or device status giving rise to his or her presence status, for example whether the mobile communications device 100 is powered on or is in a region outside of radio coverage, whether the user is busy answering messages using the device 100, or if the user is engaged in a telephone call using the device 100, the phone number that the user had dialled or accepted a call from. This presence information is selectively made available to others with access to the presence service 200, typically on a selective permission basis; for example, the mobile device 100 user may designate what other users on the network are permitted to receive the mobile device 100 user's presence information, and what subset of the presence information, described above, that each of the other users is permitted to view. As will be appreciated by those skilled in the art, the presence information may be either "pushed" to or "pulled" by the other users to their own communication devices. The presence service 200 may similarly store and serve presence information for a plurality of users of other mobile communications devices. The implementation of a presence service 200 will be understood by those skilled in the art.

Optionally, the network may also comprise a location server 210. The location server 210 may provide assistance in the determination of the mobile device 100's location, for example by computing the position of the mobile device 100 based on data received from the device 100, and/or by providing additional data to be used by the mobile device 100 or the location server 210 to compute the device 100's location.

The implementation of location systems for determining the terrestrial position of a mobile device 100 will be understood by those skilled in the art. There are a number of different location systems and technologies that may be employed by the network to compute the position of the mobile device 100, including network-based and mobile device-based technologies, such as, but not limited to, GPS, Cell-ID, wireless-assisted GPS (A-GPS), enhanced observed time difference (E-OTD), location signature or "fingerprint", received signal strength, and the like. It will be appreciated that this is not an exhaustive list of location technologies, and it will be understood by those skilled in the art that the functions of the location service 210 and the location module on the mobile communications device 100 may vary according to the location technology employed. It will be appreciated in the following description that where the geographic location of the mobile communications device 100 is determined, the process may be carried out at the mobile communications device 100 using only the device's location module, by the device's location module with support from the location service 210, or by the location service 210 with data received from the mobile communications device 100.

The network of FIG. 1 is also provided with a coverage service 220. This service collects and serves data relating to service boundaries, which, as explained below, may be defined with reference to the received signal strength detected at various terrestrial locations or other criteria. The coverage service 220, the location service 210, and the presence service 200 each may comprise a server or server system; two or more of the coverage service 220, location service 210, and presence service 200 may be combined in a single system, for example in a self-contained server system or a component of a messaging gateway; also, the functions of one or more of the services 220, 210, and 200 may be implemented on the message server system 40. Alternatively, one or more of the three services 220, 210, and 200 may be operated by a different entity.

In a first embodiment, the message server system 40 is operated by an enterprise, while the presence service 200 is operated by the carrier and the coverage service 220 is maintained by either the carrier or a separate entity such as a third-party service provider which provides network services, such as message forwarding, to the enterprise maintaining the server system 40. The location service 210 may be operated by the carrier or by a further entity. In this manner, the coverage service 220 can potentially collect and serve data, as set out in further detail below, from and to all mobile communications devices 100 or presence services 200 registered or associated with the carrier. Communication among the mobile device 100 and the various services 220, 210, and 200 is provided over the exemplary network of FIG. 1, for example over the Internet 20, although the services may be directly connected with the wireless infrastructure 90 or gateway 85, or with each other. The coverage service 220 may be operated by a third-party service provider that may provide services to users of mobile devices registered with a plurality of carriers operating wireless networks 105. In this embodiment, the coverage service 220 is not restricted to operation with a single carrier's network, and can therefore collect and serve data from and to mobile devices 100 and presence services 200 registered with or associated with multiple carriers. This embodiment will facilitate the development of the service coverage data described below.

Figure 2:
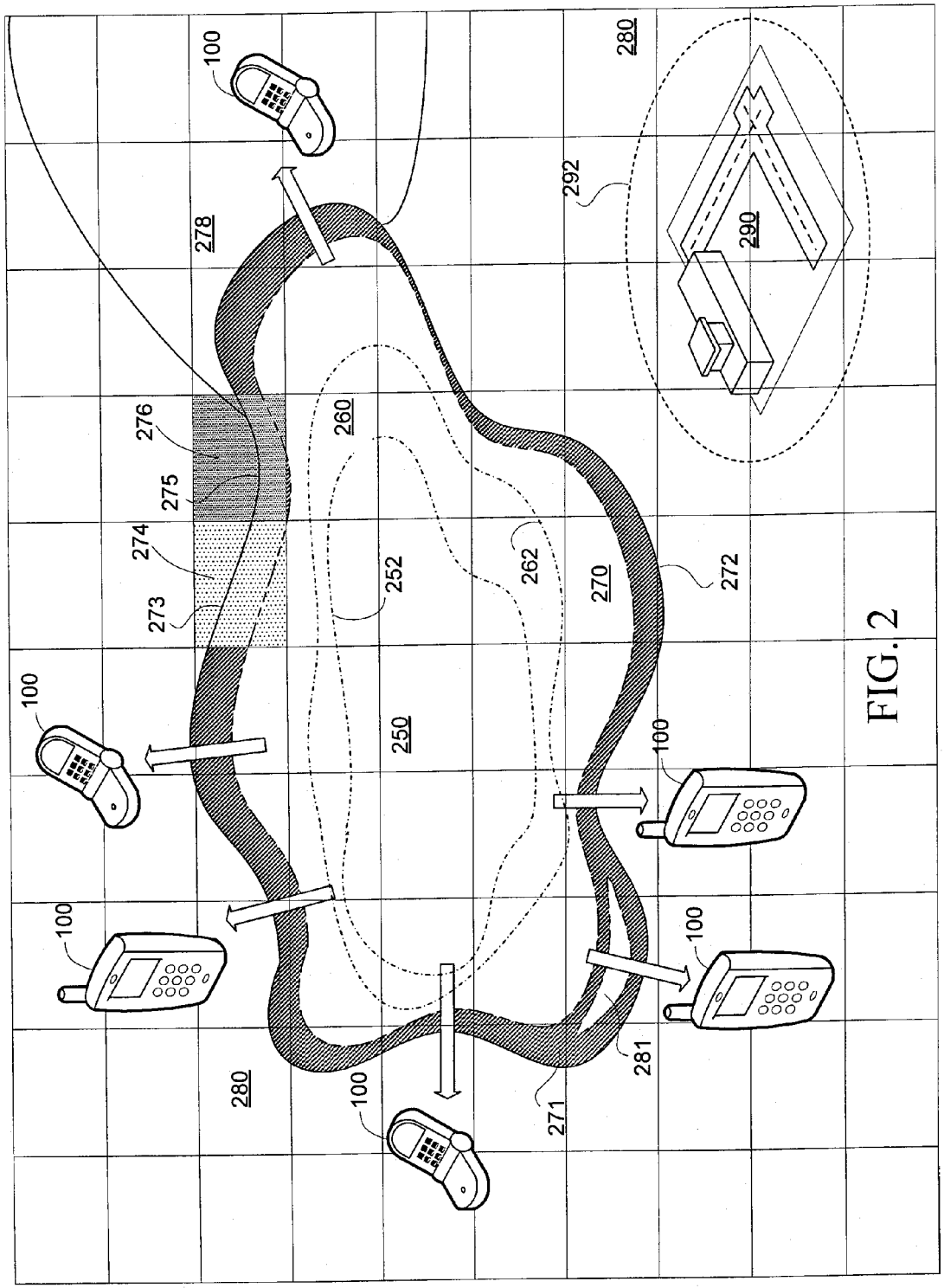
FIG. 2 is a schematic diagram of an exemplary network coverage area for the network of FIG. 1.

FIG. 2 is an exemplary map depicting two network coverage regions 270, 290, in a given geographic area. The entire geographic area may be notionally subdivided into a plurality of geographic regions, such as the regions 274 and 276. In the example of FIG. 2, the geographic regions are shown as being generally rectangular in configuration which may be defined by latitude and longitude, although this configuration is not mandatory. The plurality of geographic regions may also be defined according to the distribution of base stations or configuration of cells within a cellular network; however, a single geographic region may comprise only a portion of a cell, an entire cell, or a greater area than that covered by a single cell. Methods for defining the geographic regions (for example, by using latitude and longitudinal data, and so forth) will be understood by those skilled in the art.

Typically, the strength of a signal received by a mobile communications device 100 from a transmitting station in a wireless network varies depending on the geographic location of the mobile communications device 100 in relation to the transmitter. The received signal strength may also be affected by a host of other factors, including natural and artificial structures and phenomena, which can result in multipath effects, interference, or dead zones. In some portions of a geographic region, therefore, voice and/or data communication functions may not be available to a mobile communications device 100 because the received signal strength is too low or non-existent. If the user of the mobile communications device 100 is engaged in voice or data communications while traveling within a geographic region and moves from an area with high received signal strength to a region with lower received signal strength, the voice call or data transmission may be dropped or discontinued.

If a presence service 200 collects and tracks presence status information for the user of the mobile communications device 100 on the network, then the mobile communications device 100 may, upon determination that a user's availability on the network has changed (i.e., a user has ceased to be available for voice and/or data communication, or the user, having previously been unavailable for voice and/or data communication, has become available for such communication), transmit presence information in a notification addressed to the presence service 200, in a manner that is known in the art. However, if the reason for the user's changed availability is due to the loss of signal at the mobile communications device 100 or a similar cause, then the mobile communications device 100 may be unable to transmit the presence information to the presence server 200 in a timely manner.

Therefore, in the preferred embodiment, one or more service boundaries such as service boundary 272 and service boundary 292 are defined. The service boundary 272 is the perimeter of a network coverage region 270 defined in relation to a predetermined quality of service or service provider. For example, the network coverage region 270 may be a region in which it has been determined that the average received signal strength at a mobile communications device 100 anywhere within that region is above a threshold value acceptable for maintaining voice and/or data communication between the mobile communications device 100 and the base station that would likely service the device 100 in that region. For example, the network coverage region 270 may be a region in which the typical received signal strength of a signal transmitted from a base station and received at a mobile communications device is at least as high as −85 dBm. If a mobile communications device 100 crosses this boundary from the network coverage region 270 to the region 280 outside the service boundary 272, it is expected that the typical received signal strength at the mobile communications device 100 will be lower than −85 dBm. The network coverage region 270 may also comprise further network coverage sub-regions such as regions 250 and 260, also shown in FIG. 2. These sub-regions 250, 260 may be defined as regions in which the typical received signal strength at a mobile communications device 100 is at least as high as a threshold signal intensity that is greater than the threshold defined in relation to the network coverage region 270. Thus, for example, the sub-region 260 may be a region in which the typical received signal strength at the mobile communications device 100 is at least −80 dBm, while the sub-region 250 may be a region in which the typical received signal strength is at least −70 dBm.

It will be appreciated that these suggested threshold values are examples only; acceptable received signal strength thresholds will vary from mobile device to mobile device, and will also depend on the type of wireless network involved. The minimum received signal strength at which a first mobile communications device 100 is able to maintain a connection with a base station may vary depending on whether the network 105 is a CDMA, GSM, or WiFi network, or employs a different type of protocol. Similarly, while a first mobile device 100 may be able to maintain a connection with a given network at a signal strength of −92 dBm, for example, a second device 100 may drop a connection at the same received signal strength on the same network. Thus, there may be a single service boundary 272 defining a network coverage region 270 for each individual mobile communications device 100 and network 105 combination, but for a plurality of mobile devices 100 and/or a plurality of networks in the same geographic area, the various thresholds described above may be more accurately represented in the aggregate as a service boundary zone 271. For example, the network coverage region 280 outside the service boundary zone 271 may be defined as a region in which substantially all mobile communications devices 100 will detect a received signal strength that is below the minimum threshold value for maintaining a connection with a base station in the relevant network 105, and there may not be a single minimum threshold value defined for the service boundary zone 271. It will also be appreciated that the service boundary zone 271 may not be continuous. There may be interruptions within the zone 271, such as the zone 281, in which the typical received signal strength drops to below the minimum threshold value, or in which the received signal strength is above the minimum threshold value. The network service regions and service boundaries and boundary zones of FIG. 2 are simple examples for the purpose of illustration. A single geographic area may consist of a plurality of network service regions, boundaries, and zones, some of which may be in a nested arrangement. The service boundary zone 271 may thus be aptly described as an aggregation of service boundaries, such as the service boundary 272. It will be appreciated that where reference is made below to a service boundary 272, the service boundary 272 may be comprised in a zone 271.

Defining the network coverage regions and sub-regions 270, 250, 260 thus provides an indicator of the likely quality of service in the regions defined by their respective boundaries, 272, 252, and 262. This quality of service may correlate to the likelihood of the availability of voice and/or data communication to a device 100 located within those regions or sub-regions, or to the likelihood that a call is dropped due to a weak signal. For example, if a mobile communications device 100 crosses the service boundary 272 or the service boundary zone 271 into the network coverage region 280, as indicated by the arrows in FIG. 2, there is an increased likelihood that an ongoing voice call will be dropped due to loss of signal, or that voice and/or data communication services will not be available at all. Thus, the physical location of the mobile communications device 100 may be correlated to the user's availability on the network.

The definition of these network coverage regions and sub-regions 270, 250, 260 thus correlates to the availability of a user of a mobile communications device 100 in the entire geographic area. Thus, for example, if the service boundary 272 or service boundary zone 271 defines an area of sufficiently strong signal intensity such that a voice call is unlikely to be dropped, and a user's mobile communications device 100 is located in a geographic area entirely contained by the service boundary 272 or the service boundary zone 271, an inference may be made that the user is available for voice communication. This inference may be represented as presence information indicating that the user is available for voice communication.

The network coverage region 270 may alternatively be a region in which it is determined that a mobile communications device 100 registered will typically be serviced by a first carrier, rather than a second carrier. FIG. 2 also depicts a further network coverage region 278 adjacent to the network coverage region 270. The network coverage region 278 may be serviced by a different wireless network service provider (i.e., carrier) than region 270. Thus, when a mobile communications device 100 crosses the boundary 272 or boundary zone 271 from a first network coverage region 270 to a second region 278, the mobile communications device 100 may be handed over from its home network (available in the first region 270) to a different, visited network (available in the second region 278) with a consequential change in the cost to the user of operating the mobile communications device 100; for example, when the user is within the region 278, use of packet data communications may incur a higher charge than the user would pay if the data communication were serviced by the home network in the first region 270. In a region 270 that is serviced by more than one carrier, the network coverage region 270 may be defined as the region in which a mobile communications device 100 is typically serviced by the user's carrier of choice, that is to say, the carrier network on which the mobile communications device 100 is registered.

Alternatively, the network coverage region 270 may be defined as the region in which certain packet data communication functions (for example, IM) are typically available to users of mobile communications devices 100, and the region 280 outside the service boundary 272 or service boundary zone 271 may therefore be defined as a region in which those communication functions are not available.

Defining the network coverage region 270 in according to these alternative definitions also provides for the correlation between the availability of a user of a mobile communications device 100 and the device 100's location in the geographic area. If the service boundary 272 or service boundary zone 271 defines a region in which IM communication is available and the user's mobile communications device 100 is located in a geographic area contained within the service boundary 272 or service boundary zone 271, an inference may be made that the user is available for IM communication. It will be appreciated that the service boundary 272 or zone 271 may define an area in which more than one criteria is met; for example, the service boundary 272 or zone 271 may define an area 270 in which the signal strength is typically in excess of −85 dBm, and in which IM communication or GPRS service is available.

The signal strength ranges and criteria provided above are given as examples only; those skilled in the art will appreciate that other threshold values may be set to define the network coverage regions and sub-regions 270, 250, 260. When, in this description, reference is made to "typical" received signal strength or other "typical" criteria, it will be appreciated that this terminology refers to a statistically significant likelihood that the received signal strength in the region or sub-region will meet or exceed the threshold value, or that the requirements of the criteria will be met. For example, the network coverage region 270 may be defined as an area in which 95% of all mobile communications devices 100 sampled in the region detect a received signal strength that is equal to or exceeds the minimum signal strength required to maintain a connection with a base station. The region 270 may be defined with respect to a particular carrier's wireless network 105 and/or a particular wireless protocol.

Alternatively, other service boundaries may be arbitrarily defined as perimeters of dead zones in respect of voice and/or data communications, whether the areas defined by those boundaries are in fact regions with low or no signal reception available for mobile communications devices 100. For example, it may be desirable to designate a hospital, airport, or other locale as a region in which users of mobile communications devices 100 are not able to receive incoming calls, in order to minimize the likelihood of interference with radiofrequency equipment in that locale. It may also be known that a particular structure, such as a tunnel, effectively blocks all signals from wireless networks within a certain distance of the tunnel's exits. Such network coverage regions may be defined by a service boundary such as service boundary 292, as shown in FIG. 2. The location of a mobile communications device 100 within the network coverage region 290 defined by the service boundary 292 may then be correlated to the unavailability of the user of the mobile communications device 100 for incoming voice and/or data communication, and this unavailability may be reflected in presence information transmitted by or on behalf of the mobile communications device 100.

Service boundaries and their respective network coverage regions such as the service boundary 272 defining the network coverage region 270 may be determined using techniques known in the art. For example, a coverage service 220 may collect data from a plurality of mobile communications devices 100 employed by various users within the geographic area. The plurality of devices 100, each equipped with a location module such as a GPS module, may be configured to periodically determine the terrestrial location of the device 100 and report, at a minimum, the location data to the coverage service, with associated received signal strength data such as the measured intensity of the received signal at the identified location in dBm, and optionally with carrier data identifying the carrier and wireless network 105 with which the reporting mobile communications device 100 was registered at the time the signal strength measurement was taken. Personal identification of the user or identifying data relating to the mobile communications device 100, such as the IMEI, need not be collected by the coverage service 220. From the location and signal strength data (and optionally carrier data) thus aggregated, a locus of geographic locations may be determined according to predetermined criteria, such as those described above. Thus, for example, a locus of geographic points defining a service boundary 272 or a service boundary zone 271 around a network coverage area 270 within which the received signal strength at a mobile communications device 100 is at or above a predetermined threshold, and consequently outside of which network coverage area 270 the received signal strength at a mobile communications device 100 drops below the predetermined threshold, may be determined from the aggregate data.

Figure 3A:
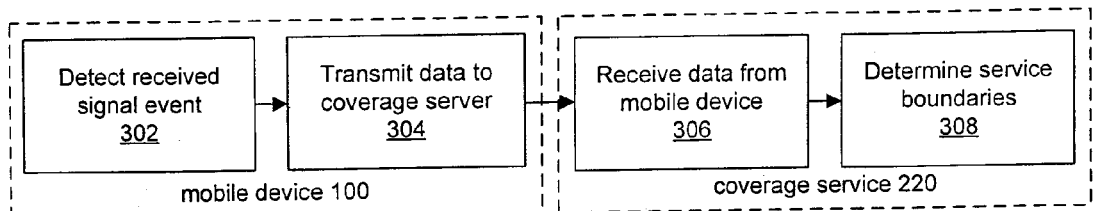
FIG. 3a is a flowchart of a method for aggregating signal strength data for the network coverage area of FIG. 2.

Briefly, the method by which service boundaries 272 or service boundary zones 271 may be defined is illustrated in the flowchart of FIG. 3a. As a first step 302, each of a plurality of mobile communications devices 100 detects an event triggering the measurement of the received signal strength at the device 100. The event may be a timed instruction causing the device 100 to take a signal strength reading on a periodic basis, or the event may be an instruction or request from a coverage service 220 to take a reading. The device 100 records the received signal strength and the location data for the current position of the device 100 as described above, and transmits this data to the coverage service 220 at step 304. At the coverage service 220, the data is received at step 306 and the aggregated data is used at step 308 to determine the service boundaries 272 or service boundary zones 271.

This sequence of steps 302 through 308 may be carried out repeatedly using a number of mobile communications devices 100 deployed in the geographic area during an initial stage of this embodiment, and is not repeated after the initial stage, once the service boundaries 272 or zones 271 are determined. It will be appreciated that the service boundary 272 may not be definable with exact precision, particularly since the received signal strength measured at a mobile device 100 may be affected by the type of device 100, multipath or shielding effects dependent on the immediate environment of the device (e.g., whether the device is traveling in a vehicle, shielded by an artificial or natural structure), and so forth. Indeed, the location of the service boundary 272 or zone 271 may vary over time. Thus, preferably the coverage service 220 continues to collect data as described above, and applies newly collected data to the computation of the service boundary 272 or zone 271. Older data may be aged and given less or no weight as newer data is collected by the coverage service 220. Thus, preferably, the steps 302 through 308 are repeatedly carried out using a plurality of devices in the geographic area, and the data thus aggregated is used to further refine the service boundaries 272 or zones 271 that were previously defined. In this preferred embodiment, the service boundaries 272 or zones 221 comprise a boundary or zone defined using peer-based data collected from a number of devices 100. Because the boundaries 272 and zones 271 are determined using data collected by the coverage service 220 from user devices on an ongoing basis, the defined boundaries 272 and zones 271 are kept reasonably up to date, and are more accurate than boundaries or zones predicted from theoretical models.

For those network coverage regions 290 that are arbitrarily defined, the coverage service 220 need not collect such data, because the service boundary 292 of the arbitrarily defined network coverage area 290 may be defined with respect to a predetermined set of terrestrial coordinates.

A preferred system and method for determining the availability of a user of a mobile communications device 100 in a messaging network, such as the wireless network 105, will be described with reference to the flowcharts illustrated in FIGS. 3b and 3c as well as to the geographic area illustrated in FIG. 2. The coverage service 220 stores and maintains service coverage data including definitions of one or more service boundaries 272, 292 or zones 271 and the characteristics of the network coverage areas defined by those boundaries or zones. Because different devices 100 may have different signal strength threshold requirements for maintaining a wireless connection, different service coverage data may be stored for different families of devices 100 sharing similar RF characteristics or for different wireless networks protocols (CDMA, GSM, GPRS, and so on). This data is transmitted to mobile communications devices 100 deployed in the geographic area of FIG. 2. However, the amount of data defining the various service boundaries 272, 292 or zones 271 may be quite large, and therefore the service coverage data may be divided into sets, each of which comprises service coverage data for a given geographic region, such as the geographic regions 274 or 276 of FIG. 2. A geographic region may comprise at least one segment of a service boundary; for example, the geographic region 274 comprises a segment 273 of the service boundary 272 or zone 271, and the geographic region 276 comprises a segment 275 of the service boundary 272 or zone 271. Thus, a set of service coverage data for the geographic region 274 will comprise data identifying the geographic location of the segment 273.

The mobile communications device 100, as noted above, is provided with a location module for using one or more different techniques for determining the geographic location of the device 100, such as a GPS module. The mobile communications device 100 may have been previously provisioned with a set of service coverage data for the geographic region in which the device 100 is generally resident. Whether the device 100 is provisioned with service coverage data or not, in the preferred embodiment, the mobile communications device 100 on a periodic basis determines, using its location module, the current physical location of the device 100.

Figure 3B:
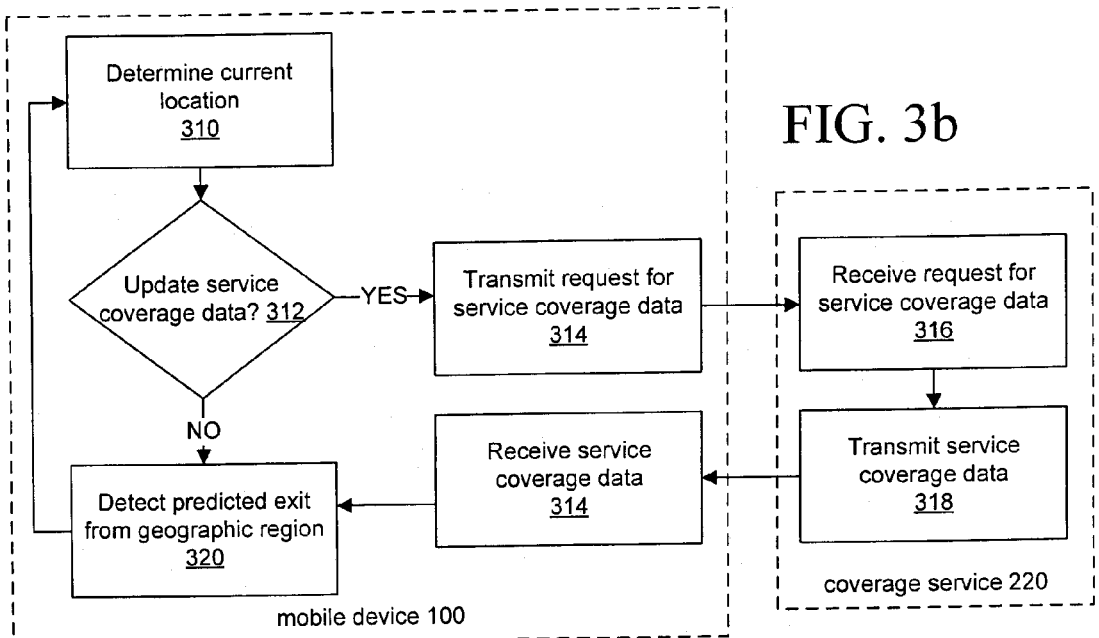
FIG. 3b is a flowchart of a method for updating network coverage data at a mobile communication device.
Figure 3C:
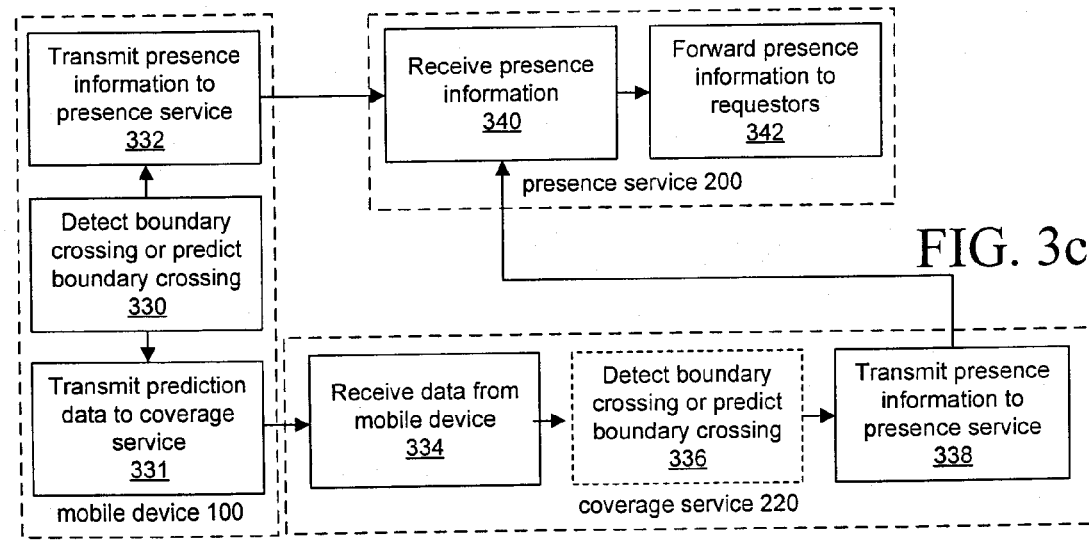
FIG. 3c is a flowchart of a method for updating presence data for a user of a mobile communication device.

This process is represented as step 310 in FIG. 3b. The device 100 then determines whether it requires updated service coverage data at step 312. If the mobile device 100 is already provisioned with service coverage data for the geographic region covering the current location of the device 100, then the device 100 does not, as yet, have any need to download a further set of service coverage data. If the mobile device 100 determines that it lacks service coverage data for the current location of the device, then the device 100 transmits a request for updated service coverage data to the coverage service 220 at step 314. The request comprises an indicator of the current geographic location of the mobile communications device 100; in one embodiment, the request issued by the mobile communications device 100 may also comprise an indicator of the current received signal strength measured by the device. If necessary, the request may also comprise an indicator of the device 100's RF characteristics, or the networks for which the device 100 requires data. The coverage service 220 receives the request at step 316, and uses the data provided in the request to select the appropriate set of service coverage data for the device 100's current geographic location. If the request also comprised signal strength data, then the coverage service 220 may add the location and signal strength data thus received to the data collection used to compute the service boundary 272 or zone 271. At step 318, the coverage service 220 transmits the selected service coverage data to the mobile communications device 100, and at step 314 the mobile communications device 100 receives and stores the service coverage data. The service coverage data is thus updated at the mobile communications device 100, and the device 100 is now provisioned with data relating to any segments of the service boundary present in the geographic region in which the device 100 is currently situated.

In addition to periodically determining its location, the mobile communications device 100 may store tracking data for use in determining the likely trajectory of the device 100. For example, the mobile communications device 100 may store location data for the past five to fifteen minutes, or for a shorter or longer period of time, which may be used to compute the current average velocity of the device 100. A running average velocity may be computed using data for the most recent two or more locations of the mobile communications device 100, and the timestamps corresponding to those last two or more locations. The velocity, and the current location of the device 100, may be used to predict the likely location of the mobile communications device 100 in the next brief period, e.g. 15 seconds to one minute in the future. This time period may be reduced or lengthened, depending on the desired accuracy of the prediction. It will be appreciated that the most accurate predictions will be directed to the immediate future, rather than the more distant future. Methods by which the trajectory of the mobile communications device 100 may be predicted will be known to those skilled in the art; however, it will be noted that a simple prediction algorithm such as the foregoing, which does not require relatively intense computation, may be carried out at the mobile communications device 100 without unduly taxing the processor or power resources of the device 100. A more complex prediction algorithm, which may combine geopositioning data relating to roadways and buildings with the tracking data recorded by the mobile communications device 100, may require more intense use of computing resources, and is preferably executed at the coverage service 220 or another server remote from the device 100. If the computation for predicting the future position of the mobile device 100 is carried out at the coverage service 220 or other remote server, then the mobile communications device 100 transmits the tracking data it collects to the coverage service 220 or other server, and receives from that server data indicating the predicted location based on that tracking data. Combining the tracking data collected by the mobile communications device 100 with other map data may improve the precision of the prediction. For example, without map data, the coverage service 220 or mobile communications device 100 itself may only infer that, given tracking data comprising location and velocity data, the device 100 is traveling in a straight line. However, if the mobile communications device 100 is determined to be located on a curved roadway and the device's velocity indicates travel in the same direction as the roadway, a prediction of the device's future position may take into account the curvature of the roadway.

The tracking data is used to predict the future location of the mobile communications device 100 on a periodic basis. In one embodiment, the prediction of the future location of the device 100 is updated each time the current location of the device 100 is updated by the device's location module. The predicted location is used to predict whether the mobile communications device 100 is expected to cross a service boundary 272 or a service boundary zone 271, or exit the geographic region in which the device 100 is currently located, according to the service coverage data stored at the device 100. If the mobile device 100 determines that it is predicted to exit the geographic region corresponding to the service coverage data with which the device 100 is currently provisioned, as indicated at step 320 of FIG. 3b, the device 100 then determines the geographic region that it is expected it will enter at step 310, then transmits a request to the coverage service 220 for updated service coverage data corresponding to the new geographic region at step 312.

At the same time that the mobile communications device 100 utilizes the tracking data to predict exit from a current geographic region, the device 100 also similarly predicts, using the tracking data, whether the device 100 is likely to cross a service boundary 272 or a service boundary zone 271 in the next brief period. Turning to FIG. 3c, upon detection that a boundary crossing is predicted, the mobile communications device 100 transmits the tracking data or an indicator indicating that the boundary crossing is predicted to the coverage service 220 at step 331. The coverage service 220, in turn, receives the data from the mobile device at step 334. If the mobile communications device 100 transmits only tracking data, the coverage service 220 may carry out a step of determining the prediction that the mobile communications device 100 is about to cross the service boundary at step 336; however, if the mobile device 100 transmits only an indicator that it is about to cross the service boundary, then the coverage service 220 may omit step 336. The coverage service 220 is provided with configuring data correlating the network coverage region 270 with user presence indicators. For example, if the network coverage region 270 is defined as a region in which the received signal strength at the mobile communications device 100 is at or above a predetermined threshold value, such as at least 30% of the maximum expected signal strength, then if it is determined at step 330 or 336 that the device 10 is exiting this region and entering a region of lower than 30% maximum expected signal strength, the coverage service 220 may determine that the user will cease to be available for voice and/or data communication as a result in the drop in signal strength. Accordingly, the coverage service 220 generates and transmits presence information to the presence service 200 associated with the mobile communications device 100 at step 338, indicating that the user of the mobile communications device 100 is not available. Conversely, if it is determined that the user is entering the network coverage region 270, then the user will be available for voice and/or data communications; therefore, the coverage service 220 transmits presence information to the presence service 220 at step 338, indicating that the user of the mobile communications device is available. In either case, the coverage service 220 operates as a proxy for the mobile communications device 100, transmitting the presence information to the presence service 200 rather than requiring the mobile communications device 100 to do so. Thus, if the mobile communications device 100 does happen to drop its connection with the nearest base station as a result of signal loss when it crosses into the network coverage region 280 outside the service boundary 272, the presence information can still be forwarded to the presence service 200 by the coverage service 220. The presence service 200 receives the presence information at step 340, and may forward the presence information or a subset thereof to other users registered to receive presence information relating to the user of the mobile communications device 100 at step 342.

As another example, if the predicted boundary crossing is a crossing of the service boundary 292 into a network coverage region 290 where inbound calls are discouraged, the coverage service 220 may issue presence information to the presence server 220 indicating that the user of the mobile communications device 100 is not available for any form of incoming communication. When it is predicted that the mobile communications device 100 is exiting the network coverage region 290, the coverage service 220 may issue updated presence information to the presence server indicating that the user is again available for incoming communication. While the network coverage region 290 has been described in the context of premises where inbound communications are discouraged, the region 290 could also be defined with respect to the user's home or private office, where the user prefers to avoid incoming calls, or to receive calls by an alternate device, such as a landline. If the region 290 is one in which the user prefers to be contacted at another telephone number or contact address, the coverage service 220 may be configured to transmit presence information that also comprises a forwarding telephone number or address for communication.

In a further embodiment, the mobile communications device 100 is configured to correlate each network coverage area 270, 278, 290 with a particular availability status; the coverage service 220 need not carry out that correlation. In that case, the mobile communications device 100 generates and transmits the presence information to the presence service 200 at step 332, as shown in FIG. 3c. If the mobile communications device 100 is configured to transmit the presence information, then the user may configure the presence information to be sent in response to the prediction of different boundary crossing events. The mobile communications device 100 may thus be configured to transmit presence information in response to the same events as those described in respect of the coverage service 220. As a further example, if the network coverage area 278 corresponds to a region serviced by a different carrier than the service provider of the mobile communications device user's home network and use of the different carrier for text communications results in a higher cost for the user, the user may wish to appear unavailable for text communications so long as he or she is within the network coverage region 278. Thus, the user may configure the mobile communications device 100 to transmit presence information indicating the user's unavailability to the presence service 200 when the mobile device 100 predicts, at step 330, that the device will likely cross a service boundary 272 or zone 271 into the network coverage region 278 within a brief period. Thus, other users inquiring after the mobile device user's availability for IM or other text communication will be advised that the user is not available.

Furthermore, when the mobile communications device 100 determines at step 330 that a boundary crossing is predicted, if the expected change in service resulting from the predicted boundary crossing is a loss of signal, the mobile communications device 100 may issue a notification to the user of the mobile communications device 100 indicating that signal loss is likely imminent. This warning may provide the user with sufficient time to complete any communication tasks before a call is dropped or wireless connectivity is lost. For example, if the user is located in the network coverage region 270 and is traveling towards the boundary 272 or zone 271, the advance notification may provide the user with sufficient time to stop traveling, and complete any e-mails or other text messages, or complete any telephone calls that he or she wishes to send or make before leaving the region 270. By providing the notification to the user or presence service upon predicting that a change in service will be experienced at the mobile communications device 100, rather than waiting for the change in service to actually occur, the user experience is enhanced by providing the mobile device user with an opportunity to complete any important communications before leaving (or entering) a network coverage region, and by providing other users with timely information regarding the availability of the mobile device user on the network.

The notification to the user may comprise a visual, audible, vibratory, or other sensory notification. While the choice of notification may be configurable by the user, in one embodiment the notification is always audible if the device 100 is not currently in use; for example, if the device 100 is "in holster" (i.e., the device is in a carrying case and the device's visual display is not readily visible to the user), the notification may be a distinctive tone or other audible message. The mobile communications device 100 may alternatively determine whether an audible notification, rather than a vibratory or visual notification, should be used based on the tracking data stored by the device 100; if it is determined that the mobile communications device 100 is traveling with significant velocity (which suggests that the user is traveling in a vehicle), then an audible notification is used, because the user is likely not looking at the device 100. In a further embodiment, an audible notification is also provided if the user is engaged in a voice call using mobile communications device 100.

In the foregoing examples, the presence information is transmitted to the presence service 200. It will be appreciated by those skilled in the art that the presence information may also be transmitted directly from the coverage service 220 or the mobile communications device 100, although it may be preferable to assign this function to the presence service 200. The implementation of a presence service 200 with the functionality described herein will be understood by those in the art. The presence service 200 is operable to provide for the transmission of presence information stored at the service 200 to other users on the network. For example, such presence information may be forwarded by presence service 200 to users who are included in an authorized "buddy" list and who are authorized to receive status updates relating to the user of the mobile communications device 100. The presence information may also be routed by the presence service 100 or the coverage service 220 to a corporate telephony system (not shown), or to another messaging system, such as the enterprise messaging server 40 shown in FIG. 1. The use of presence information by those systems is known in the art.

Figure 4:
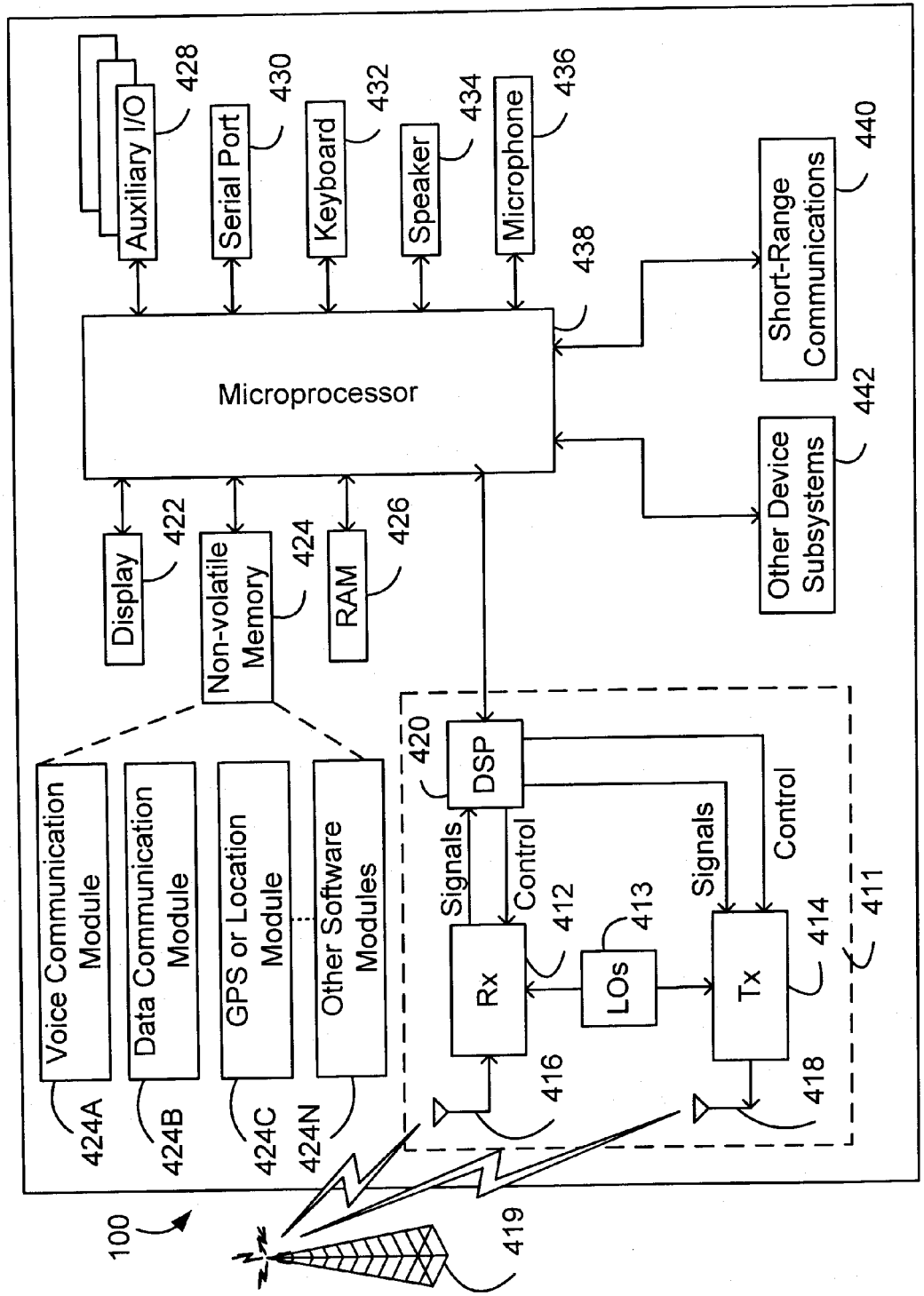
FIG. 4 is a block diagram of a system overview of a conventional hand-held mobile communication device for use with the network of FIG. 1.

The systems and methods disclosed herein may be used with many different computers and devices, such as a wireless mobile communications device shown in FIG. 4. With reference to FIG. 4, the mobile communications device 100 is a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and are preferably embedded antennas. It will be appreciated that the antennas provided for the mobile device 100 are preferably operable in conjunction with the location technology implemented on the mobile device 100, as contemplated in the foregoing description. However, the systems and methods described herein are in no way restricted to a particular type of antenna, or even to wireless communication devices.

The mobile communications device 100 is preferably a two-way communication device having voice and data communication capabilities. Thus, for example, the mobile communications device 100 may communicate over a voice network, such as any of the analog or digital cellular networks, and may also communicate over a data network. The voice and data networks are depicted in FIG. 4 by the communication tower 419. These voice and data networks may be separate communication networks using separate infrastructure, such as base stations, network controllers, etc., or they may be integrated into a single wireless network.

The transceiver 411 is used to communicate with the network 319, and includes the receiver 412, the transmitter 414, the one or more local oscillators 313 and the DSP 320. The DSP 320 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 311 via a link between the DSP 420 and the microprocessor 438.

The detailed design of the transceiver 411, such as frequency band, component selection, power level, etc., will be dependent upon the communication network 419 in which the mobile communications device 100 is intended to operate. For example, a mobile communications device 100 intended to operate in a North American market may include a transceiver 411 designed to operate with any of a variety of voice communication networks, such as TDMA, CDMA, PCS, etc., whereas a mobile communications device 100 intended for use in Europe may be configured to operate with the GPRS data communication network and the GSM voice communication network. Other types of data and voice networks, both separate and integrated, may also be utilized with a mobile communications device 100.

Depending upon the type of network or networks 419, the access requirements for the mobile communications device 100 may also vary. For example, in GPRS data networks, network access is associated with a subscriber or user of a mobile device. A GPRS device typically requires a subscriber identity module SIM, which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile communications device 100 may the send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 preferably manages and controls the overall operation of the mobile communications device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, a data communication application 424B, and a GPS or other location module 424C may be stored in the non-volatile memory 424 for execution by the microprocessor 438. For example, the voice communication module 424A may provide a high-level user interface operable to transmit and receive voice calls between the mobile communications device 100 and a plurality of other voice or dual-mode devices via the network 419. Similarly, the data communication module 424B may provide a high-level user interface operable for sending and receiving data, such as e-mail messages, files, organizer information, short text messages, etc., between the mobile communications device 100 and a plurality of other data devices via the networks 419. The location module 424C may provide a high-level user interface operable by the user to receive and optionally process location-related data, such as radiolocation data received from satellites (in the case of a GPS system) or from other radio sources for the purpose of determining the device 100's location. The location module 424C may also provide functional components that operate in the background, without user intervention, to automatically receive and process location-related data. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 4 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 is preferably stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile communications device 100. This interface typically includes a graphical component provided through the display 422, and an input/output component provided through the auxiliary I/O 428, keyboard 432, speaker 434, and microphone 436. The input/output component may also be comprised in a touch screen (not shown). The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the flash memory 424.

The non-volatile memory 424 preferably provides a file system to facilitate storage of PIM data items on the device. The PIM application preferably includes the ability to send and receive data items, either by itself, or in conjunction with the voice and data communication modules 424A, 424B, via the wireless networks 419. The PIM data items are preferably seamlessly integrated, synchronized and updated, via the wireless networks 419, with a corresponding set of data items stored or associated with a host computer system, thereby creating a mirrored system for data items associated with a particular user.

Context objects representing at least partially decoded data items, as well as fully decoded data items, are preferably stored on the mobile communications device 100 in a volatile and non-persistent store such as the RAM 426. Such information may instead be stored in the non-volatile memory 424, for example, when storage intervals are relatively short, such that the information is removed from memory soon after it is stored. However, storage of this information in the RAM 426 or another volatile and non-persistent store is preferred, in order to ensure that the information is erased from memory when the mobile communications device 100 loses power. This prevents an unauthorized party from obtaining any stored decoded or partially decoded information by removing a memory chip from the mobile communications device 100, for example.

The mobile communications device 100 may be manually synchronized with a host system by coupling the serial port 430, such as a Universal Serial Bus (USB) port, of the device 100 with a port on a computer system or other device. The serial port 430 may also be used to enable a user to set preferences through an external device or software application, or to download other application modules 324N for installation. This wired download path may be used to load an encryption key onto the device, which is a more secure method than exchanging encryption information via the wireless network 419.

A short-range communications subsystem 440 is also included in the mobile communications device 100. The subsystem 440 may include an infrared device and associated circuits and components, or a short-range RF communication module such as a Bluetooth® module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method for determining the availability of a user of a mobile communications device on a network, comprising:
   collecting, from a plurality of mobile communications devices associated with a coverage service and one or more carriers, a plurality of data sets;
   determining at least one predefined service boundary in respect of each of the one or more carriers using the plurality of data sets, the predefined service boundary defining a locus of locations where a change in service is expected to occur;
   after determining at least one predefined service boundary, generating service coverage data defining a geographic location of at least a segment of the at least one predefined service boundary for a predetermined geographic region;
   providing service coverage data comprising at least a segment of a predefined service boundary between different areas of service provided by different service providers;
   determining, using tracking data for the mobile communications device, when the mobile communications device is likely to exit the predetermined geographic region;
   transmitting to the mobile communications device further service coverage data defining the geographic location of at least a segment of the predefined service boundary for an adjacent predetermined geographic region that the mobile communications device is expected to enter; and
   issuing a notification of a change in service associated with crossing the predefined service boundary from one area serviced by one service provider to a different area serviced by another service provider.

2. The method of claim 1 wherein the change in service comprises a decrease in received signal strength below a predetermined threshold at the mobile communications device.

3. The method of claim 1 wherein the change in service comprises an increase in received signal strength to at least a predetermined threshold at the mobile communications device.

4. The method of claim 1 wherein the notification comprises at least one of the following indications:
   an indication that a current voice call may be disconnected;

an indication that at least one of voice and data connectivity is expected to be lost within a computed period of time; and an indication that the user of the mobile communications device is unavailable.

5. The method of claim 1, wherein the notification comprises an indication that the user of the mobile communications device is available.

6. The method of claim 1, wherein the tracking data comprises at least two sets of location data defining a position of the mobile communications device and timestamps associated with the location data.

7. The method of claim 1, wherein the tracking data comprises location data defining a position of the mobile communications device and velocity data defining a direction and speed of travel of the mobile communications device.

8. The method of claim 1, further comprising collecting the tracking data at the mobile communications device and providing the tracking data to a coverage service, and wherein the act of predicting is carried out at the coverage service.

9. The method of claim 8, wherein issuing the notification is carried out by the coverage service.

10. The method of claim 1, further comprising collecting the tracking data at the mobile communications device, and wherein the act of predicting is carried out at the mobile communications device.

11. The method of claim 10, wherein issuing the notification is carried out by the mobile communications device.

12. The method of claim 1 wherein the notification is issued to a user of the mobile communications device.

13. The method of claim 1 wherein the notification is issued to a presence service associated with the network.

14. The method of claim 13 further comprising forwarding, by the presence service, the notification to another user associated with the network.

15. The method of claim 1 wherein the notification is issued directly to another user associated with the network.

16. The method of claim 1 wherein the predefined service boundary is an outer periphery of a predefined service boundary zone.

17. The method of claim 1 wherein the predefined service boundary is selected from an aggregation of service boundary data comprised in a predefined service boundary zone.

18. The method of claim 1, wherein issuing a notification of a change in service is carried out immediately before the mobile communications device is predicted to cross the predefined service boundary.

19. The method of claim 1, where each data set comprises location data, associated received signal strength data, and carrier data.

20. A coverage service system for determining availability of a mobile communications device in a network, comprising:
 a memory that stores:
  a plurality of data sets collected from a plurality of mobile communications devices associated with a coverage service and one or more carriers,
  at least one predefined service boundary determined in respect of each of the one or more carriers using the plurality of data sets, the at least one predefined service boundary defining a locus of locations where a change in service is expected to occur,
  service coverage data generated after determining the at least one predefined service boundary, the service coverage data defining a geographic location of at least a segment of the at least one predefined service boundary for a predetermined geographic region, and
  tracking data received from a mobile communications device;
 a processor that predicts, using the received tracking data, when the mobile communications device is likely to exit the predetermined geographic region and issues a notification of a change in service associated with crossing the predefined service boundary from one area serviced by one service provider to a different area serviced by another service provider; and
 a transmitter that transmits to the mobile communications device, further service coverage data defining the geographic location of at least a segment of the predefined service boundary for an adjacent predetermined geographic region that the mobile communications device is expected to enter.

21. The coverage service of claim 20, wherein the processor is further configured to operate in conjunction with the transmitter to transmit the notification to a presence service associated with the user of the mobile communications device.

* * * * *